United States Patent [19]

Hockaday

[11] Patent Number: 5,071,215

[45] Date of Patent: Dec. 10, 1991

[54] PIGTAILING OPTICAL FIBER

[76] Inventor: Bruce D. Hockaday, 124 Merline Rd., Vernon, Conn. 06066

[21] Appl. No.: 621,096

[22] Filed: Nov. 30, 1990

[51] Int. Cl.$^5$ ............................................... G02B 6/30
[52] U.S. Cl. ........................................ 385/49; 385/50
[58] Field of Search .............. 350/96.17, 96.12, 96.15, 350/96.2

[56] References Cited

U.S. PATENT DOCUMENTS 4,744,619  5/1988  Cameron .......................... 350/96.17
5,018,817  5/1991  Suzuki et al. ...................... 350/96.17

FOREIGN PATENT DOCUMENTS 2-181709  7/1990  Japan ................. 350/96.17

Primary Examiner—John D. Lee
Assistant Examiner—John Ngo
Attorney, Agent, or Firm—Richard H. Kosakowski

[57] ABSTRACT

A method of aligning the optical axes of an optical fiber and a waveguide imbedded in an integrated optical chip and of attaching the fiber to the chip includes the step of coating the outer surface of the fiber with solder in the vicinity of an end of the fiber. A portion of the fiber at the coated end is cut away such that a flat surface at a tangential or near tangential relation to the fiber core results. A surface of the chip has solder pads disposed thereon such that the outer edges of the cut portion of the fiber contacts the solder pads when the flat surface of the fiber is placed in contact with the surface of the chip, such placement of the fiber onto the chip providing for vertical alignment of the optical axes of the fiber core and the waveguide in the chip. Finally, the solder on the outer fiber surface and on the solder pads is heated at the junction therebetween, the resulting surface tension forces bringing the optical axis of the fiber core into precise optical alignment with the optical axis of the waveguide in the chip.

8 Claims, 2 Drawing Sheets

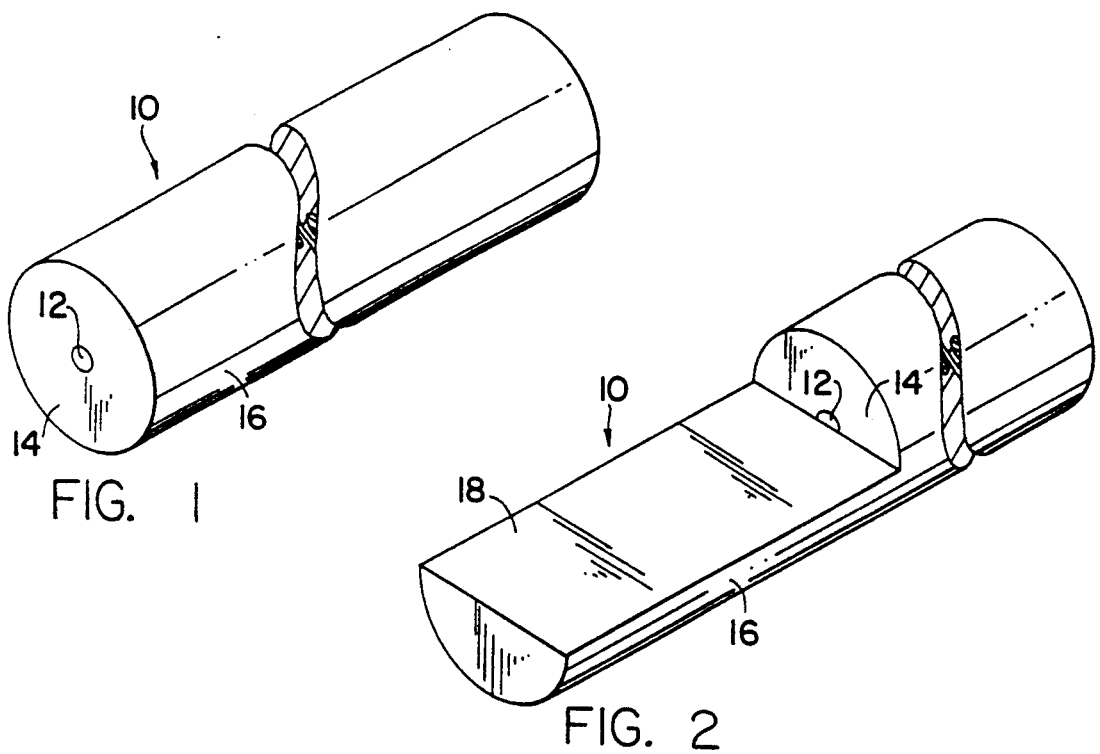
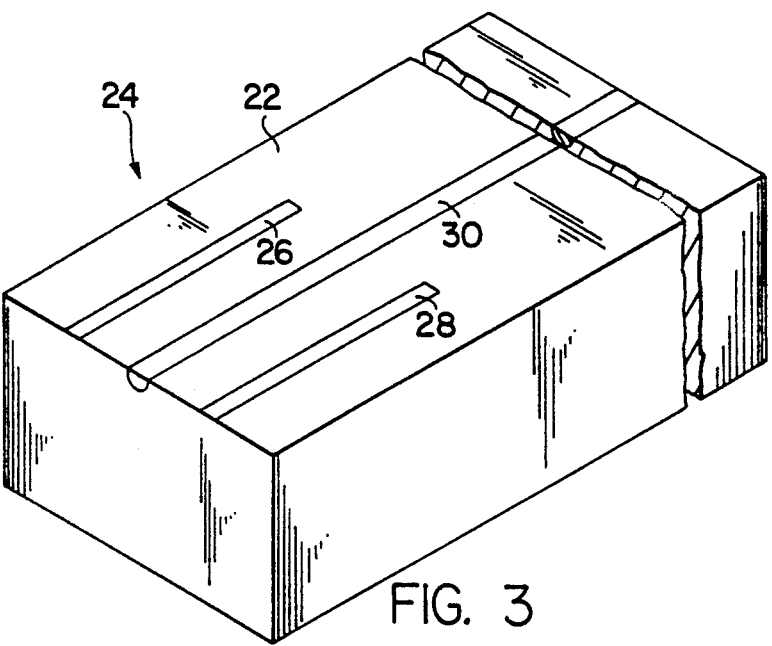

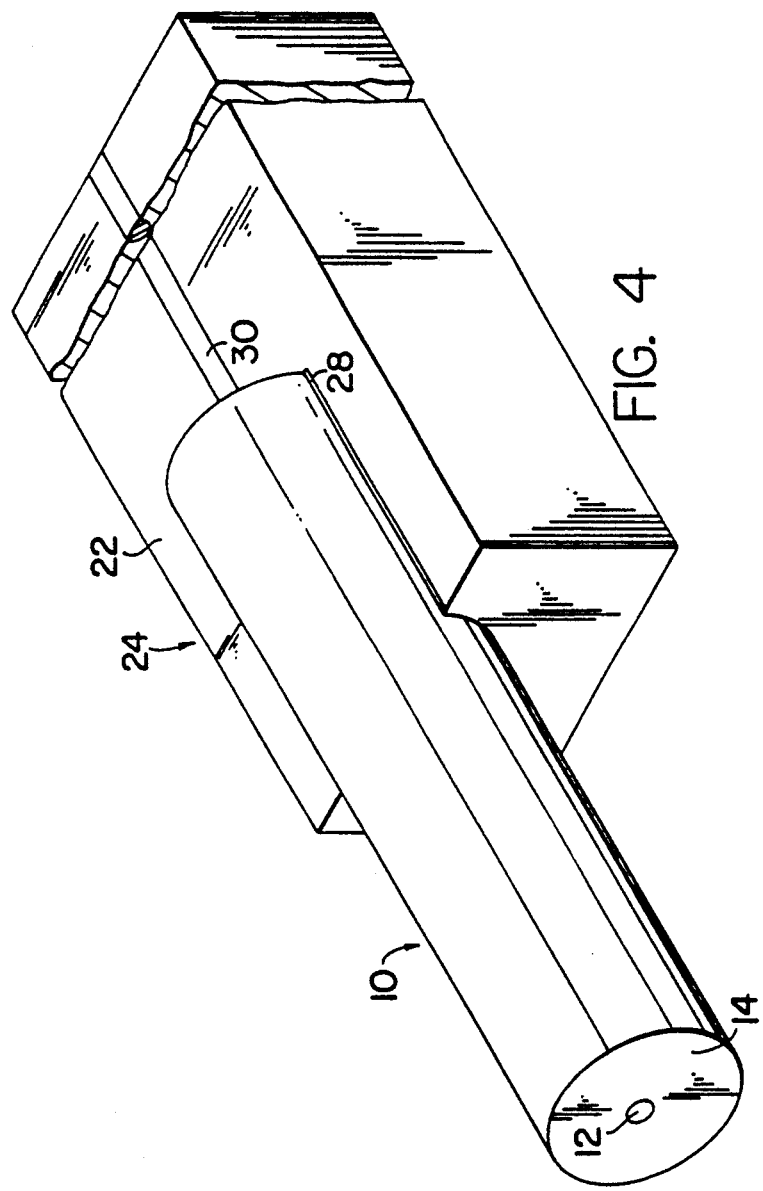

PIGTAILING OPTICAL FIBER

TECHNICAL FIELD

This invention relates to integrated optics, and more particularly to the alignment and connection of an optical fiber to a waveguide in an integrated optic chip.

BACKGROUND ART

In the art of mounting of optical fibers to integrated optic (IO) chips, it is critical that the waveguide formed or imbedded in the IO chip be in precise alignment with the fiber before affixing the fiber to the chip. Due to the typically small diameters (e.g., 0.005 to 0.01 mm) of both the fiber and waveguide, a small amount of misalignment therebetween may result in significant coupling loss of optical energy.

It is known in the prior art to use support blocks with V-grooves formed therein to support the fiber and provide a coarse lateral and angular alignment of the fiber and waveguide. However, this approach does not provide the desired precise alignment of the fiber and waveguide before the two are affixed together.

It is also known in the prior art to affix a support block to the IO chip and attach the fiber with adhesive to both the chip and block. An illustration of this is in U.S. Pat. No. 4,744,619 to Cameron. However, this method is inefficient in achieving the required precise optical alignment between the fiber and IO chip before affixation of the fiber to the chip. This is because Cameron teaches the use of elaborate micropositioner and imaging equipment apparatus for achieving alignment. The use of external positioners has a further drawback in that the positioner does not allow simultaneous positioning of closely spaced optical fibers at the output of the IO chip. Additionally, the use of external positioners is labor and capital intensive.

DISCLOSURE OF INVENTION

Objects of the present invention include the provision of an inexpensive and time saving method for interfacing an optical fiber to an IO chip such that the optical axes of the fiber and a waveguide on the IO chip are in precise alignment.

According to the present invention, a method of aligning the optical axis in the core of an optical fiber with the optical axis in a waveguide imbedded in an integrated optical chip and of attaching the fiber to the chip includes the step of coating the outer surface of the fiber with solder in the vicinity of an end of the fiber; a portion of the fiber at the coated end is cut away such that a flat surface at a tangential or near tangential relation to the fiber core results, the relation of the flat surface to the fiber core being determined by optimal coupling of light energy between the fiber core and the waveguide; a surface of the chip has solder pads disposed thereon such that the outer edges of the cut portion of the fiber contact the solder pads when the flat surface of the fiber is placed in contact with the surface of the chip, such placement of the fiber onto the chip providing for vertical alignment of the optical axes of the fiber core and the waveguide in the chip; the solder on the outer fiber surface and on the solder pads is heated at the junction therebetween, the resulting surface tension forces bringing the optical axis of the fiber core into precise optical alignment with the optical axis of the waveguide in the chip.

The method of the present invention has utility in achieving alignment of an optical fiber to a waveguide in an IO chip without the use of prior art external positioning equipment and apparatus to measure the optical transmission through the fiber/IO chip connection. The present invention is also inexpensive and time-saving, key factors in being able to produce IO devices such as fiber optic gyros in large quantities on a commercial basis.

These and other objects, features and advantages of the present invention will become more apparent in light of the detailed description of a best mode embodiment thereof, as illustrated in the accompanying drawing.

BRIEF DESCRIPTION OF DRAWING

FIG. 1 is a perspective illustration of an optical fiber;

FIG. 2 is a perspective illustration of the fiber of FIG. 1 having a portion removed in accordance with the present invention;

FIG. 3 is a perspective illustration of an IO chip prepared in accordance with the present invention; and FIG. 4 is a perspective illustration of the fiber of FIG. 2 mounted to the IO chip of FIG. 3 in accordance with the present invention.

BEST MODE FOR CARRYING OUT THE INVENTION

In FIG. 1 is illustrated a perspective view of an optical fiber 10. The fiber 10 typically comprises a commercially available, single mode fiber, having a diameter in the range of, e.g., 0.005 to 0.01 mm. The fiber has an inner core portion 12, through which light is constrained to travel by an outer cladding portion 14.

Initially, a portion of the fiber at an end is prepared by treating the outer surface 16 of the fiber with a known plating or wetting agent, e.g., such as an evaporative metal applied by known electron beam techniques. Next, the outer surface 16 of the fiber is coated with solder using the same electron beam techniques. The fiber is then attached to a substrate (not shown), such as a silicon wafer, to protect the fiber from cracking or breaking during the subsequent cutting process described hereinafter. The substrate itself has a layer of solder applied thereto. The solder on both the substrate and the fiber is melted using, e.g., known microwave soldering apparatus.

In FIG. 2 is illustrated a perspective view of the fiber 10 of FIG. 1 prepared in accordance with the present invention. A portion of the fiber at the prepared end is cut away from the remainder of the fiber such that a flat surface 18 results. The depth of cut may be, e.g., to just below the fiber core such that the flat surface 18 is tangent to the core. The saw cut is accomplished by, e.g., a fine grit diamond abrasive dicing saw blade which produces a polished, optically smooth surface 18. The depth of cut is controlled by, e.g., injecting a light beam from one end of the fiber into the core from a light source (not shown). The light beam in the core is monitored during the aforementioned cutting process by a light sensing device (not shown), such as a photodiode, to determine the proper depth of cut.

However, it is to be understood that the flat surface 18 does not have to be in a tangential relationship to the fiber core; instead, the flat surface may be in a near tangential relationship to the core. This would occur if the cut was made to a depth either somewhat beyond the core or not entirely through the core. In any event, the resulting relation between the flat surface and the core is determined by optimal coupling of optical energy between the core and the waveguide. This optimal coupling is determined experimentally prior to execution of the method of the present invention. As an example, an optical fiber of similar type and kind to that cut in accordance with the present invention may have its core cut in a similar manner using the aforementioned dicing saw blade. The core of this experimental fiber is cut, however, in increments; all the while with the light through the core being monitored by the aforementioned light sensing device. The incremental cutting process is stopped when the desired amount of light extinction through the core is observed. This translates into the optimal coupling point. The resulting depth of cut of the core of the experimental fiber is then used for the depth of cut of the fiber in accordance with the present invention.

It is to be noted that, for use with polarization maintaining fibers, the method of the present invention requires that these types of fibers be rotated into a desired orientation prior to cutting of the fiber. This is to align the extra ordinary axis of the fiber with the resulting flat surface cut into the fiber. With modern single mode fibers this extra ordinary axis can be visually observed with the naked eye or a microscope.

Referring to FIG. 3, a surface 22 of an IO chip 24 is prepared by locating a pair of solder pads 26,28 thereon. The chip 24 may comprise, e.g., lithium niobate or lithium tantalate. The areas of the chip where each solder pad 26,28 is to be located are defined using standard lithographic techniques. These areas are plated with evaporative metal using, e.g., the aforementioned electron beam deposition technique. A metered amount of solder is then applied to the plated areas using the electron beam deposition technique. The plating confines the extent to which the solder is placed on the chip.

The standard lithographic techniques used to locate the solder pads make possible the accurate alignment of the pads with respect to a waveguide 30 on the chip. The pads are located on the chip such that the outer edges of the flat surface 18 of the fiber 10 are in contact with the pads 26,28 when the fiber is ultimately brought in contact with the IO chip, as described hereinafter with respect to FIG. 4.

Referring to FIG. 4, the fiber is assembled onto the IO chip such that the flat surface 18 of the fiber is in contact with the prepared surface 22 of the chip. More particularly, the outer edges of the flat surface of the fiber are in contact with the solder pads 26,28 on the surface of the chip. This provides the vertical alignment of the optical axis of the fiber core 12 with the optical axis of the waveguide 30 on the IO chip.

The solder on the outer surface of the fiber at the junction of the fiber and the solder pads together with the solder on the solder pads is then melted using, e.g., microwave soldering apparatus. Since the flat surface of the fiber was not pretreated with solder, the molten solder will not wet this surface and come between it and the surface of the IO chip. As a result, precise horizontal alignment of the optical axes of the fiber core and IO chip waveguide is accomplished due to surface tension forces at the time of microwave soldering.

The method of the present invention has utility in achieving alignment of the optical axes of an optical fiber and a waveguide in an IO chip without the use of prior art external positioning equipment and apparatus to measure the optical transmission through the fiber/IO chip connection. The present invention is also inexpensive and time-saving, key factors in being able to produce IO devices such as fiber optic gyros in large quantities on a commercial basis.

As described hereinbefore, the optical fiber 10 is attached to a substrate to prevent the fiber from cracking or breaking during this cutting process. However, it is to be understood that this step of attaching is not required in the broadest scope of the present invention. Any method may be used, if desired, for preventing the fiber from breaking or cracking, in light of the teachings herein.

Further, the plating of the fiber and chip has been described as being accomplished using evaporative metal applied with known electron beam techniques. However, it is to be understood that, for the broadest scope of the present invention, any appropriate type of a plating or wetting agent may be applied using any appropriate known method.

All of the foregoing changes are irrelevant; it suffices for the method of the present invention that an outer surface of an optical fiber be coated with solder in the vicinity of an end thereof; a portion of the fiber at the coated end is cut away such that a flat surface at a tangential or near tangential relationship to the fiber core results; a surface of the chip has solder pads disposed thereon such that the outer edges of the cut portion of the fiber contacts the solder pads when the flat surface of the fiber is placed in contact with the surface of the chip, such placement of the fiber onto the chip providing for vertical alignment of the optical axes of the fiber core and the waveguide in the chip; the solder on the outer fiber surface and on the solder pads is heated at the junction therebetween, the resulting surface tension forces bringing the optical axis of the fiber core into precise optical alignment with the optical axis of the waveguide in the chip.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

I claim:

1. A method of aligning the optical axis in the core of an optical fiber with the optical axis in a waveguide imbedded in an integrated optical chip and of attaching the fiber to the chip, comprising the steps of:

coating the outer surface of the fiber with solder at an end of the fiber;

cutting away a portion of the fiber at said coated end such that a flat surface at a tangential or near tangential relation to the fiber core results, said relation of said flat surface to the fiber core being determined by optimal coupling of light energy between the fiber core and the waveguide;

placing solder in certain predetermined areas on a surface of the chip;

contacting said flat surface of the fiber with said solder areas on said surface of the chip such that said outer edges of said flat surface of the fiber are in contact with said solder areas of said chip, such said contacting of the fiber onto the chip providing for vertical alignment of the optical axes of the fiber core and the waveguide in the chip;

melting the solder on the outer fiber surface and on said solder areas at the junction therebetween, the resulting surface tension forces bringing the optical axis of the fiber core into precise optical alignment with the optical axis of the waveguide in the chip.

2. The method of claim 1, before said step of placing solder on a surface of the chip, further comprising the steps of:
defining said areas on said surface of the chip where said solder is to be placed; and
applying an evaporative metal to said defined areas with an electron beam.

3. The method of claim 2, wherein said step of placing solder on a surface of the chip further includes the step of applying said solder to said defined areas with an electron beam.

4. The method of claim 1, before said step of coating the outer surface of the fiber with said solder, further comprising the step of:
plating the outer surface of the fiber with evaporative metal.

5. The method of claim 4, wherein said step of plating the outer surface of the fiber with said evaporative metal includes the step of applying said evaporative metal to the fiber by electron beam.

6. The method of claim 1, wherein said step of coating the outer surface of the fiber with solder in the vicinity of an end of the fiber includes the step of applying said solder to the outer surface of the fiber by electron beam.

7. Apparatus, comprising:

an optical fiber, having an inner core portion surrounded by an outer cladding portion, a portion of an outer surface of said fiber at an end thereof being coated with solder, said fiber at said coated end having a portion cut away such that a flat surface at a tangential or near tangential relation to said core results, said relation of said flat surface to said core being determined by optimal coupling of light energy between said core and a waveguide;

an integrated optical chip, having said waveguide imbedded therein, said chip having solder located on a surface of said chip in certain predefined areas in relation to said waveguide; characterized by:

said flat surface of said fiber being attached to said chip surface such that outer edges of said flat surface of said fiber are in contact with said solder areas on said chip, such said contacting of said fiber onto said chip providing for vertical alignment of an optical axis of said fiber along said core into precise optical alignment with an optical axis of said waveguide, said solder on said outer fiber surface and on said solder areas being melted at a junction therebetween whereby resulting surface tension forces bring said optical axis along said core into precise optical alignment with said optical axis of said waveguide.

8. The apparatus of claim 7, wherein said optical fiber comprises single mode optical fiber.

* * * * *